United States Patent [19]

Rohr et al.

[11] 3,717,668

[45] Feb. 20, 1973

[54] SUBSTITUTED BISCARBAMATES

[75] Inventors: Wolfgang Rohr, 6800 Mannheim; Adolf Fischer, 6704 Mutterstadt, both of Germany

[73] Assignee: Badische Anilin- & Soda-Fabrik Aktiengesellschaft, Ludwigshafen/Rhine, Germany

[22] Filed: July 9, 1970

[21] Appl. No.: 53,680

[30] Foreign Application Priority Data

July 30, 1969 Germany................P 19 38 612.0

[52] U.S. Cl....................................260/472, 71/111
[51] Int. Cl............................................C07c 125/06
[58] Field of Search.......................................260/472

[56] References Cited

UNITED STATES PATENTS 3,551,477 12/1970 Koenig et al. ..........................260/472

Primary Examiner—Lorraine A. Weinberger
Assistant Examiner—L. Arnold Thaxton
Attorney—Johnston, Root, O'Keeffe, Keil, Thompson and Shurtleff

[57] ABSTRACT

New and valuable substituted 4-methylphenyl biscarbamates having a strong herbicidal action and a process for controlling the growth of unwanted plants with these compounds.

3 Claims, No Drawings

SUBSTITUTED BISCARBAMATES

The present invention relates to new and valuable substituted biscarbamates and herbicides containing these compounds.

It is known to use biscarbamates, e.g. methyl-N-[3-phenylcarbamoyloxy-4-methylphenyl]-carbamate, for controlling weeds; however, its action is not satisfactory.

We have now found that substituted biscarbamates having the formula

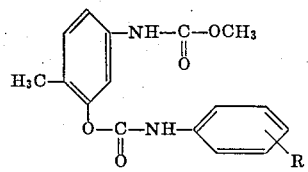

where R denotes a fluoro or trifluoromethyl radical, have a good herbicidal action combined with good crop plant compatibility.

The new active ingredients are particularly suitable for controlling the weeds Chenopodium album, Spergula arvensis, Sinapis arvensis, Thlaspi arvense, Urtica urens, Veronica arvensis, Raphanus raphanistrum, Capsella bursa pastoris, Polygonum spec., Avena fatua, Alopecurus myosuroides, Poa annua and Lolium perenne among the crop plants fodder beet and sugar beet. Application rates are about 0.5 to 10 kg, especially 1 to 4 kg, of active ingredient per hectare.

The following details illustrate the preparation of methyl-N-[3-(4'-fluorophenylcarbamoyloxy)-4-methylphenyl]-carbamate:

18.1 parts (by weight) of methyl-N-[3-hydroxy-4-methylphenyl]-carbamate and 13.7 parts of p-fluorophenyl isocyanate are stirred for 7 hours at 95° to 105°C.

After having been allowed to cool, the reaction product is dissolved in ethyl acetate and repeatedly treated with dilute caustic soda solution and then treated with dilute hydrochloric acid and with water.

The dried ethyl acetate solution is subsequently evaporated to dryness and the residue recrystallized from ethyl acetate; m.p. 177° to 179°C.

Methyl-N-[3-(3'-trifluoromethylphenylcarbamoyloxy)-4-methylphenyl]-carbamate having a melting point of 166° to 169°C is obtained analogously with m-trifluoromethylphenyl isocyanate.

Methyl-N-[3-hydroxy-4-methylphenol]-carbamate having a melting point of 131° to 133°C is prepared from methyl chlorocarbonate and 2-methyl-5-aminophenol.

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling point higher than 150°C, e.g. tetrahydronaphthalene or alkylated naphthalenes, or organic liquids having boiling points higher than 150°C and having one or more than one functional group, e.g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

The following Examples demonstrate the application of the active ingredients of the invention.

EXAMPLE 1

In a greenhouse, the plants Beta vulgar.var.sacch. (sugar beet), Sinapis arvensis (wild mustard), Thlaspi arvense (field pennycress), Urtica urens (burning nettle), Poa annua (annual bluegrass) and Lolium perenne (perennial rye grass) are treated at a growth height of 2 to 15 cm with 1 kg per hectare of methyl-N-[3-(4'-fluorophenylcarbamoyloxy)-4-methylphenyl]-carbamate (I), with 1 kg per hectare of methyl-N-[3-(3'-trifluoromethylphenylcarbamoyloxy)-4-methylphenyl]-carbamate (II) and, for comparison purposes, with 1 kg per hectare of methyl-N-(3-phenylcarbamoyloxy-4-methylphenyl)-carbamate (III), these amounts of the active ingredients each being dispersed in 500 liters of water per hectare. After 3 to 4 weeks it is ascertained that active ingredients I and II have an action on the broadleaved and grassy weeds stronger than that of III.

The results of the experiment are given in the following table:

|  | Active ingredient | | |
|---|---|---|---|
|  | I | II | III |
| Crop plants: | | | |
| Beta vulg.var.sacch. | 0 | 0 | 0 |
| Unwanted plants: | | | |
| Sinapis arvensis | 100 | 95 | 20 |
| Thlaspi arvense | 96 | 93 | 15 |
| Urtica urens | 100 | 100 | 25 |
| Poa annua | 95 | 85 | 0 |
| Lolium perenne | 90 | 80 | 0 |

0 = no damage
100 = complete destruction

EXAMPLE 2

On an agricultural site the plants Beta vulg.var.sacch. (sugar beet), Raphanus raphanistrum (wild radish), Polygonum persicaria (ladysthumb), Polygonum convolvulus (wild buckwheat), Stellaria media (chickweed), Veronica arvensis (corn speedwell), Chenopodium album (white goosefoot), Spergula arvensis (corn spurry), Capsella bursapastoris (shepherdspurse), Alopecurus myosuroides (slender foxtail) and Avena fatua (wild oat) are treated at a growth height of 2 to 10 cm with 1 kg per hectare of methyl-N-[3-(4'-fluorophenylcarbamoyloxy)-4-methylphenyl]-carbamate (I), with 1 kg per hectare of methyl-N-[3-(3'-trifluoromethylphenylcarbamoyloxy)-4-methylphenyl]-carbamate (II) and, for comparison, with 1 kg per hectare of methyl-N-(3-phenylcarbamoyloxy-4-methylphenyl)-carbamate (III), these amounts of the active ingredients each being dispersed in 500 liters of water per hectare. After 3 weeks it is ascertained that I and II have a stronger herbicidal action than III.

| | Active ingredient | | |
|---|---|---|---|
| | I | II | III |
| Crop plants: | | | |
| Beta vulg.var.sacch. | 0 | 0 | 0 |
| Unwanted plants: | | | |
| Raphanus raphanistrum | 98 | 93 | 15 |
| Polygonum persicaria | 95 | 95 | 0 |
| Polygonum convolvulus | 95 | 90 | 0 |
| Stellaria media | 100 | 95 | 5 |
| Veronica arvensis | 100 | 90 | 0 |
| Chenopodium album | 100 | 100 | 5 |
| Spergula arvensis | 100 | 85 | 0 |
| Capsella bursa pastoris | 98 | 95 | 10 |
| Alopecurus myosuroides | 95 | 80 | 0 |
| Avena fatua | 80 | 65 | 0 |

0 = no damage
100 = complete destruction

EXAMPLE 3

60 parts by weight of compound I from Example 1 is mixed with 40 parts by weight of N-methyl-α-pyrrolidone. A mixture is obtained which is suitable for application in the form of very fine drops.

EXAMPLE 4

20 parts by weight of compound II from Example 1 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 5

20 parts by weight of compound I from Example 1 is dissolved in a mixture consisting of 40 parts by weight of cyclohexanone, 30 parts by weight of isobutanol, 20 parts by weight of the adduct of 7 moles of ethylene oxide to 1 mole of isooctylphenol; and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 6

20 parts by weight of compound II from Example 1 is dissolved in a mixture consisting of 25 parts by weight of cyclohexanol, 65 parts by weight of a mineral oil fraction having a boiling point between 210° and 280°C, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 7

20 parts by weight of compound I from Example 1 is well mixed with 3 parts by weight of the sodium salt of diisobutylnaphthalene-sulfonic acid, 17 parts by weight of the sodium salt of a ligninsulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1 percent by weight of the active ingredient.

EXAMPLE 8

3 parts by weight of compound I from Example 1 is intimately mixed with 97 parts by weight of particulate kaolin. A dust is obtained containing 3 percent by weight of the active ingredient.

EXAMPLE 9

30 parts by weight of compound II from Example 1 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:

1. A substituted biscarbamate having the formula

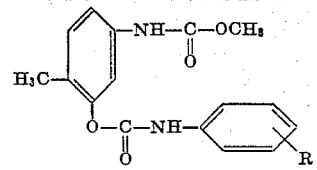

where R denotes fluoro or trifluoromethyl.

2. A substituted biscarbamate having the formula

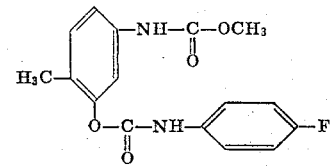

3. A substituted biscarbamate having the formula

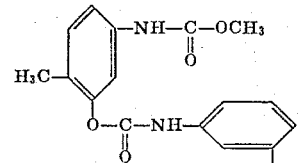

* * * * *